G. A. GOELITZ.
TOP TRIM FOR CANDY PAILS.
APPLICATION FILED JAN. 4, 1912.

1,026,435.

Patented May 14, 1912.

Witnesses
Frank R Glox
H.C. Rodgers

Inventor
G.A. Goelitz
By George H Thorpe Atty.

UNITED STATES PATENT OFFICE.

GUSTAV A. GOELITZ, OF KANSAS CITY, MISSOURI.

TOP TRIM FOR CANDY-PAILS.

1,026,435.  Specification of Letters Patent.  Patented May 14, 1912.

Application filed January 4, 1912. Serial No. 669,473.

*To all whom it may concern:*

Be it known that I, GUSTAV A. GOELITZ, a citizen of the United States, residing at Kansas City, in the county of Jackson and State of Missouri, have invented certain new and useful Improvements in Top Trims for Candy-Pails, of which the following is a specification.

This invention relates to trimming for candy pails, and my object is to produce what I term a top trim for giving a pail filled with candy a finished and attractive appearance.

As pails of candy are at present marketed, a series of triangular cartons are arranged in the pail and divide the same into a plurality of chambers for the purpose of eliminating in large measure the chance of soft candy when deeply buried in the pail being crushed or pressed out of shape. If the pail is of sufficient depth two tiers of such cartons are employed and a horizontal partition used between each tier so that the soft candies which may be located near the bottom of the pail shall not be subjected to the weight of the superposed candies. The upper edges of the cartons or the upper tier of cartons, presents a raw or unfinished appearance which is unattractive and to give these cartons a finished appearance and therefore make the pail of candy more attractive to the purchaser my top trim is employed.

A further object is to produce a top trim of simple, and cheap construction and which can be instantly applied to or removed from the pail.

To these ends the invention consists in certain novel and peculiar features of construction as hereinafter described and claimed, and in order that it may be fully understood reference is to be had to the accompanying drawing, in which—

Figure 1:
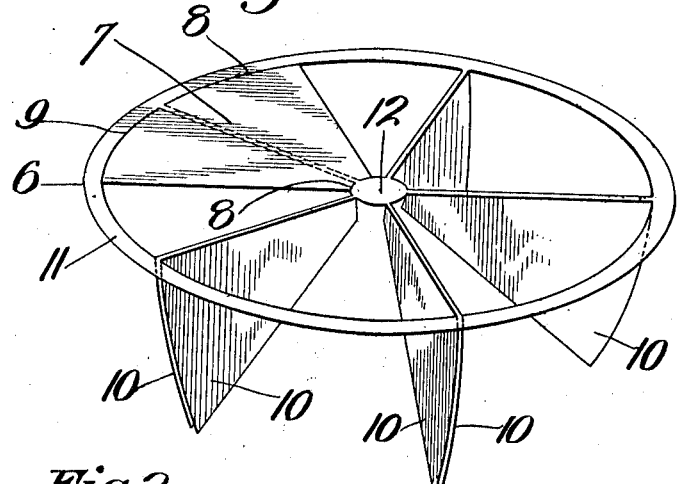
Figure 2:
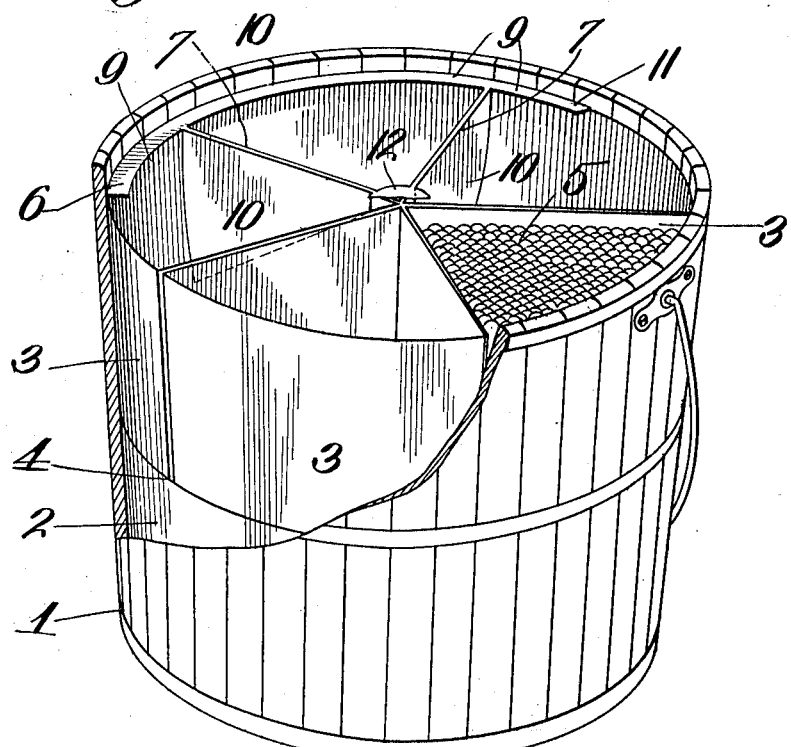

Figure 1, is a perspective view of a top trim for candy pails embodying my invention. Fig. 2, is a sectional perspective view of a candy pail of common type in which a fragment of the top trim is shown in operative position.

In the said drawing, 1 indicates a candy pail of the usual or any preferred type, and 3 are superposed tiers of cartons which originally are of triangular form, but which when secured in a pail filled with candy conform to the curvature of the pail as shown in Fig. 2, a circular partition 4 being interposed between the two tiers of cartons so that the weight of the candy 5 in the upper tier shall rest on said partition and not upon the candy in the lower tier of cartons. The cartons as shown, are arranged flatwise together so that their inwardly extending walls shall constitute a series of radial partitions.

6 is a top trim, the same being produced from a single piece of cardboard or equivalent material of sufficient diameter to fit snugly in the upper part of the pail and rest upon the upper series of cartons. This circular piece of material is radially cut by means of a suitable die or otherwise from a point near the center to a point near the circumference so as to provide a series of separated triangular portions 7, and said portions are cut by means of a die or otherwise at their inner and outer ends from their side margins to points adjacent to their radial centers, said cuts numbered 8 and 9 being parallel with the outer margin and respectively adjacent to the center from which their sides radiate and the outer margin of the trim so that the said portions 7 may be folded downward to constitute pairs of depending wings 10, as shown, said wings being bent downward in the manner explained and shown when the "trim" is ready to be applied to the pail, it being understood that it is applied in operative position before the cartons or the upper tier of cartons, is charged with candy. When in operative position the wings fit down upon the adjacent walls of the cartons so as to hide the rough upper edges thereof, the ring portion 11 of the trim rests upon the outer walls of the cartons and hides the same from view, and the central portion 12 covers and hides from view the abutting inner edges of the cartons as shown clearly in Fig. 2, as at such point the cartons rarely come together properly, as they would if they were filled with a finely comminuted substance, the candy being of lumps which cannot well completely fill the inner angles for the purpose of holding the inner ends thereof in symmetrical relation. When the cartons are filled the weight of the candy holds the wings pressed tightly against adjacent walls of the cartons, and not only gives the pail of candy a finished and attractive appearance but guards against accidental dislodgment of the trim.

From the above description it will be apparent that I have produced a top trim for candy pails embodying the features of advantage enumerated as desirable and I wish it to be understood that I reserve the right to make all changes properly falling within the spirit and scope of the appended claims.

I claim:

1. A top trim, comprising a device of skeleton form and consisting of a central portion, an outer portion surrounding the central portion and radial portions connecting the central and outer portions and each provided with a pair of depending wings.

2. The combination with a circular receptacle and radial partitions therein, of a trim upon said radial partitions consisting of a central portion covering the inner ends of the radial partitions, an outer portion fitting against the inner side of the receptacle, radial portions extending from the inner portion to the outer portion and upon the radial partitions, and wings depending from said radial portions and fitting against the opposite sides of the said radial partitions.

3. The combination with a circular receptacle or pail, a series of triangular cartons fitting in the receptacle and lying in the same horizontal plane and abutting sidewise together so that their abutting sides shall extend radially from the center of the pail to the wall thereof, of a trim resting upon said tier of cartons and consisting of a small central portion covering the inner ends of the side walls of the cartons, an outer circular portion fitting against the inner side of the pail and resting upon said cartons, and radial portions extending from the inner portion to the outer portion in the vertical plane of and above the abutting walls of said cartons and provided with depending wings, the wings of each of said radial portions depending into adjacent cartons and fitting flatly against the adjacent walls of the said cartons.

In testimony whereof I affix my signature, in the presence of two witnesses.

GUSTAV A. GOELITZ.

Witnesses:
H. C. RODGERS,
G. Y. THORPE.

---

Copies of this patent may be obtained for five cents each, by addressing the "Commissioner of Patents, Washington, D. C."